United States Patent

[11] 3,601,262

| [72] | Inventors | Andrew J. Petros;<br>Clement S. Rybar, both of Pittsburgh, Pa. |
|---|---|---|
| [21] | Appl. No. | 818,498 |
| [22] | Filed | Apr. 23, 1969 |
| [45] | Patented | Aug. 24, 1971 |
| [73] | Assignee | Mesta Machine Company<br>Pittsburgh, Pa. |

[54] CORE REMOVAL APPARATUS
18 Claims, 18 Drawing Figs.

| [52] | U.S. Cl. | 214/1 BB,<br>214/1 BV |
|---|---|---|
| [51] | Int. Cl. | B66c 1/06 |
| [50] | Field of Search | 214/1 B, 1<br>BS |

[56] References Cited
UNITED STATES PATENTS

| 3,110,405 | 11/1963 | Tegtmeier | 214/1 B2 |
|---|---|---|---|
| 3,348,785 | 10/1967 | Cocker | 214/16.4 |

*Primary Examiner*—Gerald M. Forlenza
*Assistant Examiner*—George F. Abraham
*Attorney*—Don J. Smith ABSTRACT: We disclose in a rolling mill having at least one rolling mill stand and a coil entry section for said stand disposed adjacent thereto, said entry section including a coil feed reel, a scrap core removal mechanism mounted adjacent said feed reel and having scrap core pickup means engageable with a scrap core on said reel and movable to a scrap core release position, a movable scrap core receptacle, and means for moving said receptacle between said release position and a repository for said scrap core.

INVENTORS
Andrew J. Petros and
Clement S. Rybar.
BY
Buell Blenko & Ziesenheim
THEIR ATTORNEYS

CORE REMOVAL APPARATUS

Our present invention relates to an improved entry section for a rolling mill or the like, and more particularly to an entry section having scrap core removal apparatus associated therewith.

In the operation of a typical rolling or strip mill, incoming strip coils are passed successively through the mill. As each coil nears a complete payout stage, the mill is stopped and a new or full size incoming coil is deposited on the entry section or entry coil handling equipment forming part of the mill. The inmost wraps (scrap core) remaining from the preceding coil are sheared off near the payout reel. The inner wraps normally have been damaged during previous and necessary handling operations. After the shearing operation, the strip leading to the shear is rewound on the payout or feed reel, and this strip portion, together with the remaining inner wraps of the coil, are discarded or scrapped.

At the present time, the unavoidably damaged inner wraps of the coils (along with the sheared off section) are removed and discarded manually—a time-consuming and laborious operation. Because of the extreme speeds obtained by modern rolling mills (which may be in the order of 5000 feet per minute) a serious loss of production occurs during the manual removal of the scrap cores. Such loss in production is multiplied, of course, by the number of coils processed through the rolling mill. The actual processing or rolling time for an average coil is only about 3 minutes as compared to about 1 minute required to remove the scrap core by present manual techniques. Manual core removal, therefore, accounts for a significant loss in potential production.

The manual operation, moreover, entails additional operating personnel, usually of the semiskilled variety, which renders the manual scrapping operation less reliable and more time consuming. The proximity of such operating personnel presents a considerable hazard in view of the several items of moving equipment associated with the entry end of the rolling mill, for example the coil cars or carriages, movable reel, hold-down roll, coil-measuring devices, flexible floor plate in addition to the rolling components of the mill itself and the trailing end of the strip.

In accordance with our invention, we have reduced the aforedescribed laborious and time-consuming operation to a pushbutton mechanical arrangement in which the scrap cores are removed quickly and efficiently. The exposure of operating personnel to moving equipment during the core-scrapping operation, is thereby essentially eliminated. We also combine many of the scrap removal operations with the other necessary mechanical movements of the mill entry end. In consequence, the time normally consumed in disposing of the scrap cores is drastically reduced, if not eliminated altogether. It follows, then, that the productional losses experienced with the conventional methods of scrap core removal are virtually eliminated. In fact, our invention makes possible the removal of the scrap core during the time inevitably involved in the coil-changing procedure, which includes installing a new coil on the payout reel and related operations. In addition to the core scrapping feature, our invention incorporates other improvements in the entry coil section of the mill. Accordingly, the time required for the installation of successive coils is further shortened with attendant increases in rolling mill production.

We accomplish these desirable results and overcome the deficiencies of prior practices, by providing in a rolling mill having at least one rolling mill stand and a coil entry section for said stand disposed adjacent thereto, said entry section including a coil feed reel, a scrap core removal mechanism mounted adjacent said feed reel and having scrap core pickup means engageable with a scrap core on said reel and movable to a scrap core release position, a movable scrap core receptacle, and means for moving said receptacle between said release position and a repository for said scrap core.

We also desirably provide similar apparatus wherein said entry section includes a movable coil car, means are provided for moving said car between said feed reel and a coil-receiving position thereof remote from said reel, said core receptacle being coupled to said coil car for movement therewith.

We also desirably provide similar apparatus wherein a flexible floor plate section is connected to at least one side of said car for movement therewith, and said core receptacle is connected to said floor plate section for movement therewith.

We also desirably provide similar apparatus wherein track means are provided for said floor plate, said track means having a retractable track section defining said coil-receiving position, actuating means are provided for moving said retractable track section between an open position when said car is at said coil-receiving position and a closed position when said car is removed from coil-receiving position.

We also desirably provide similar apparatus wherein an additional movable coil car and an entry coil conveyor are provided, and means are provided for moving said additional coil car between said entry coil conveyor and a coil-transfer position adjacent said coil-receiving position.

We also desirably provide in a rolling mill having at least one rolling mill stand and a coil entry section for said stand disposed adjacent thereto, a coil feed reel, a first coil car movable between an entry coil conveyor and a coil-transfer position, a second coil car movable between said coil-transfer position and said feed reel, flexible floor means including track members disposed adjacent said coil-transfer position, said track members being spaced to define said position, and a retractable track section mounted on the adjacent end portion of one of said track members for bridging the space therebetween.

During the foregoing discussion, various objects, features and advantages of the invention have been set forth. These and other objects, features and advantages of the invention together with structural details thereof will be elaborated upon during the forthcoming description of certain presently preferred embodiments of the invention and presently preferred methods of practicing the same.

In the accompanying drawings we have shown certain presently preferred embodiments of the invention and have illustrated certain presently preferred methods of practicing the same, wherein:

FIG. 7 is an enlarged partial cross-sectional view of the apparatus as shown in FIG. 5B and taken along reference line VII—VII thereof;

Figure 1:
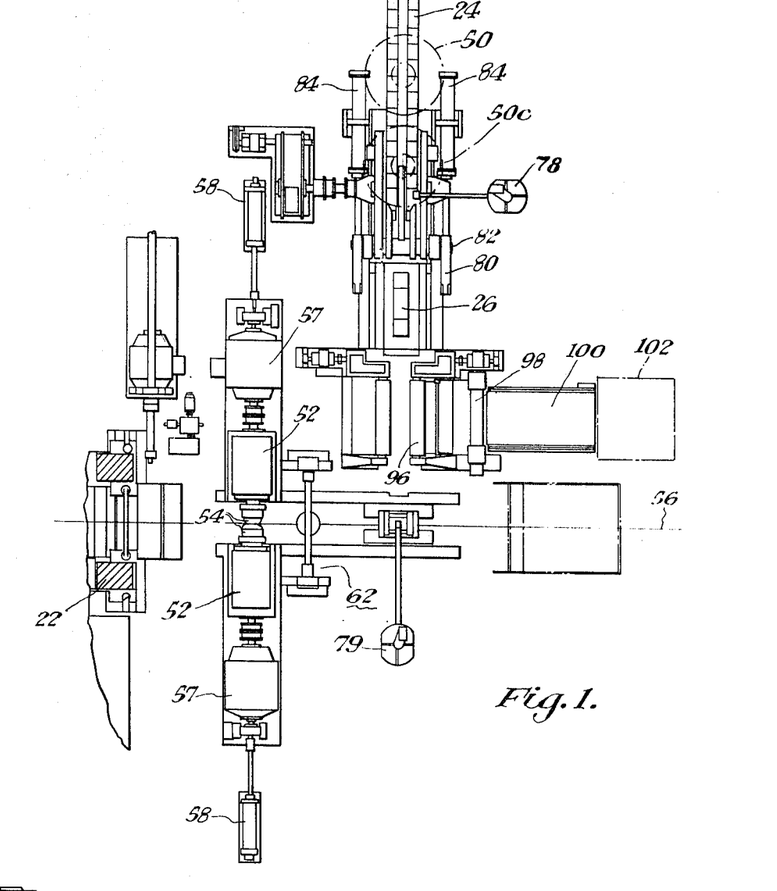
FIG. 1 is a partial top plan view of a rolling mill utilizing our invention and illustrating our novel coil-handling and scrap removal apparatus together with a portion of an entry stand of the mill.
Figure 2:
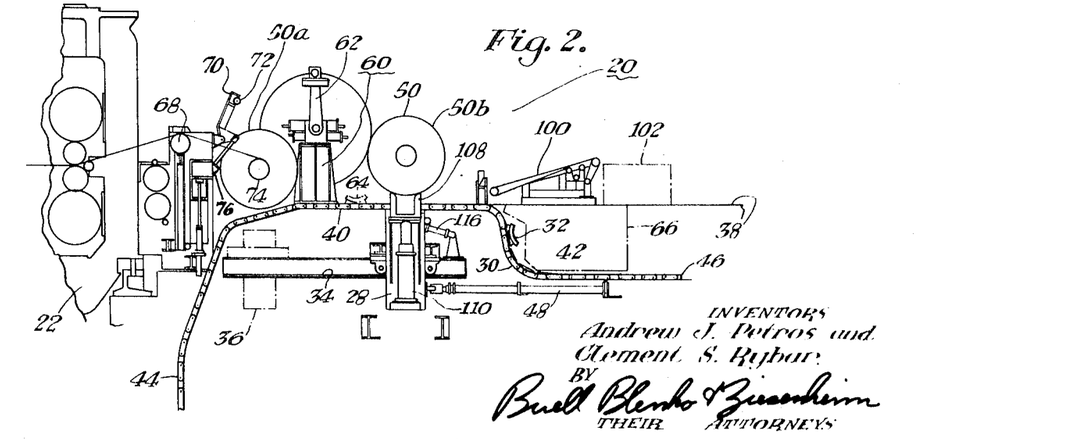
FIG. 2 is a side elevational view of the apparatus as shown in FIG. 1.
Figure 3:
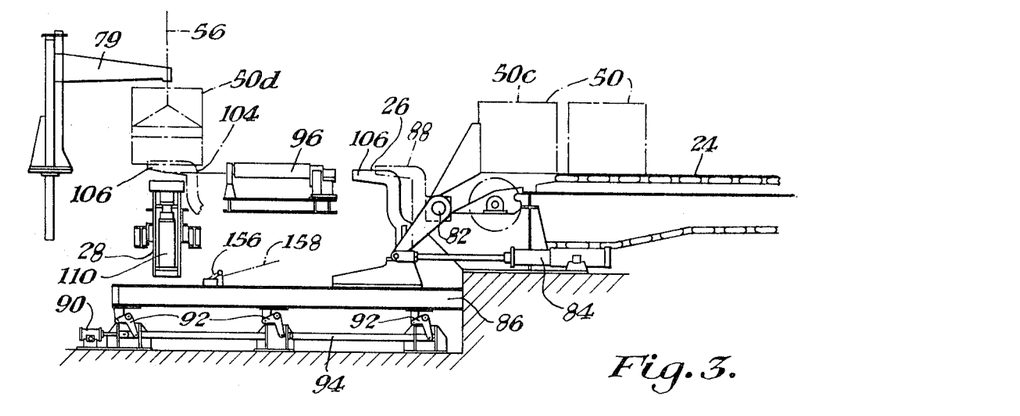
FIG. 3 is a partial end elevational view of the apparatus as shown in FIG. 1.
Figure 4A:
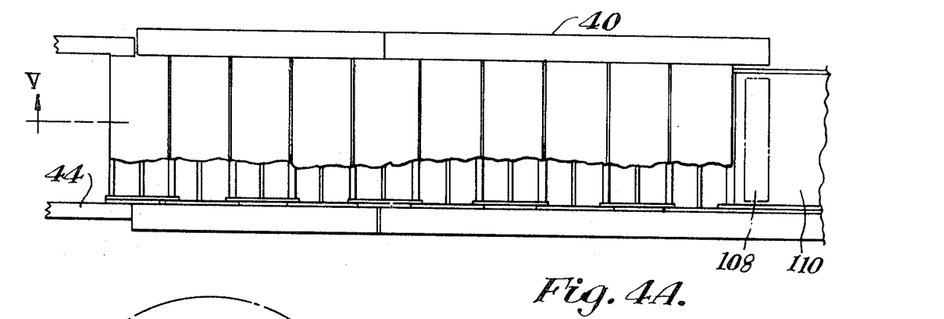
FIGS. 4A and 4B constitute a composite, enlarged, top plan view of the flexible floor plate and the second coil carriage, as shown in FIG. 1.
Figure 4B:
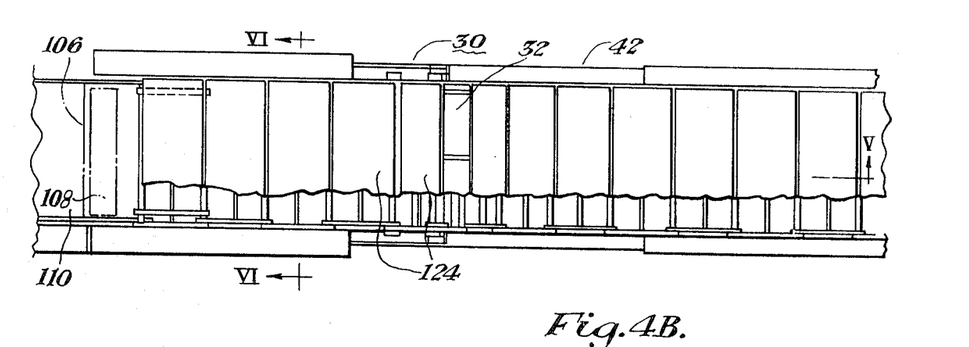

Referring now to FIGS. 1–3 of the drawings, the exemplary arrangement of our invention is incorporated in the entry section of a strip-rolling mill 20 or the like, of which an initial stand is denoted by reference character 22. The stand 22 and associated components are conventional in construction, and therefore will not be elaborated upon.

The coil entry mechanism for the strip mill 20 includes an entry coil conveyor 24 (FIGS. 1 and 3), a first coil car or carriage 26, a second coil car 28 (FIG. 2), and a flexible floor plate 30 having a scrap core receptacle 32 mounted thereon for movement with the flexible floor plate 30. The floor plate 30 in turn is connected to the second coil car 28 for movement therewith as described more fully below.

The second coil car 28 is wheel-mounted for movement along its track 34 between limits defined by the solid outline position of the coil car 28 in FIG. 2 and its chain position 36. To protect operating personnel the necessary opening for this purpose in floor 38 is covered by the flexible floor plate 30, the structure of which is illustrated in succeeding figures. The component flexible sections 40, 42 of the floor plate 30 are mounted respectively in tracks 44, 46 and are propelled therealong by movements of the second coil car 28 (under impetus of cylinder 48) to which the floor plate sections 40, 42 are connected.

The solid outline position of the coil car 28 in FIG. 2 represents its coil-transfer position relative to the first coil car 26. The chain outline position 36 of the second coil car 28 is assumed when a coil 50 is delivered to feed reel 52 (FIG. 1) of the rolling mill 20. The feed or payout reel 52 includes a pair of retractable and collapsible mandrel components 54, which can be moved outwardly of center line 56 of the mill 20 when necessary to add a new coil or to withdraw the scrap core. The mandrel components are direct coupled to a pair of respective generators 57 which serve as dynamic brakes. The mandrel components 54, which are shown in their operative or closed position can be withdrawn or retracted by cylinders 58.

The inner wraps or scrap core remaining after the coil 50a has been paid out are removed by means of a magnetic pickup unit denoted generally by reference character 60 and described in greater detail below. The unit 60 includes a pivotally mounted arm 62 which deposits the scrap core in receptacle or cradle 32, at the chain-outlined position 64 thereof, when the coil car 28 is in its chain-outlined position 36. The movements of the pickup unit 60 are integrated with movements of the coil cars 26, 28 as described below in the operational paragraphs and thus the time formerly consumed in the manual removal of the scrap core is virtually eliminated. During the subsequent traverse of the coil car 28 to its coil loading or transferring position (the solid outline thereof in FIG. 2) the scrap core receptacle 32 dumps the core into scrap core bin or repository 66, which is placed in the coil car pit.

When the scrap core has been deposited in the bin 66 the coil car 28 is then in position to receive a new coil 50b (FIG. 2) from coil car 26 (FIGS. 1 and 3). The transfer can be accomplished while the previous coil 50a is being paid out of the feed reel 52 to tensioning roll 68 and other components of the mill 20. When the coil 50a has been paid out to the usually damaged innermost wraps, a pivoted arm 70 and holddown roller 72 are employed to restrain the scrap core 74 as the latter is sheared off. The holddown roller and arm 70–72 are actuated by cylinder 76 (FIG. 2). The scrap core 74 is then removed as described more fully below.

From FIGS. 1 and 3, it is seen that the entry coil conveyor 24 brings the incoming coils 50 to the coil unloading station denoted by coil 50c at which location the width of the coil is determined by conventional measuring device 78 (FIG. 1). A similar measuring device 79 (FIGS. 1 and 3) is mounted adjacent the coil-transfer position of the coil cars for measuring the diameter of the coil 50. A coil up-ender 80 is pivotally mounted on the entry conveyor framework at 82 and is actuated by cylinder 84. The coil car 26 is wheel-mounted for movement along its track 86 and is shown in solid outline in FIG. 3 adjacent its coil-receiving station relative to the entry conveyor 24. To remove the coil from the up-ender 80, the car 26 and its track 86 are moved upwardly as denoted in part by chain outline 88 of the coil car 26. This movement of the coil car 26 and track 86 is accomplished by a relatively short throw cylinder 90 and a number of pivoted links 92 which are connected to the push rod 94. From the up-ender 80 the coil car 26 moves the coil to a conventional coil positioner 96 (FIGS. 1 and 3) where the leading edge of the coil is squared off by shear 98. The trimmings are removed by scrap conveyor 100 to scrap bin 102 (FIGS. 1 and 2). The coil car 26 is propelled along its track 86 by suitable drive means such as an electric motor drive (not shown). The car 26 can be centered under the coil by a limit switch and suitable circuitry (not shown) coupled to the coil width measuring device and the car drive.

Figure 9A:
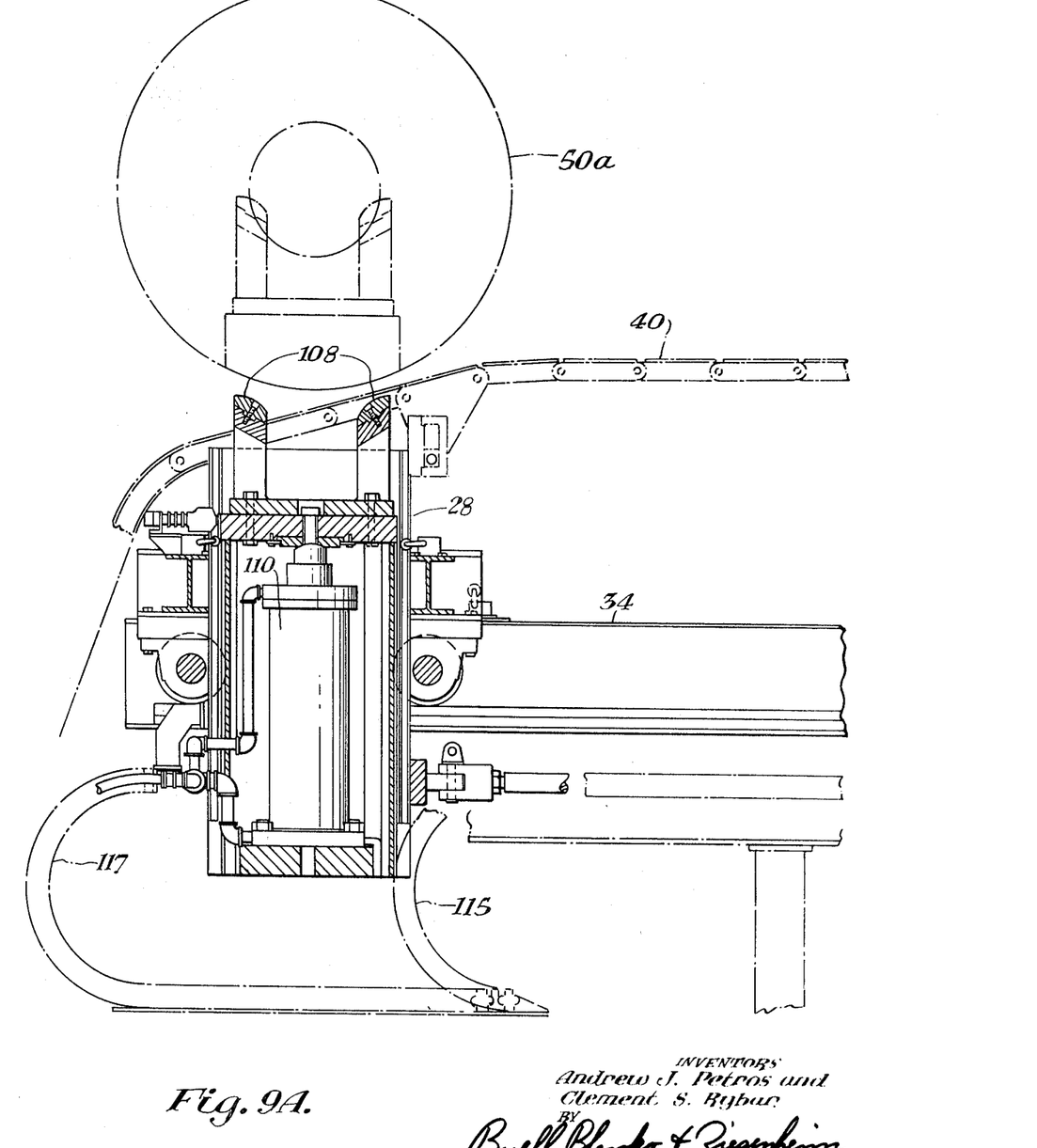
FIGS. 9A and 9B constitute a composite, elevational view, partially in section, of the apparatus of FIG. 4 and showing the alternate positions of the second coil-transfer car.
Figure 9B:
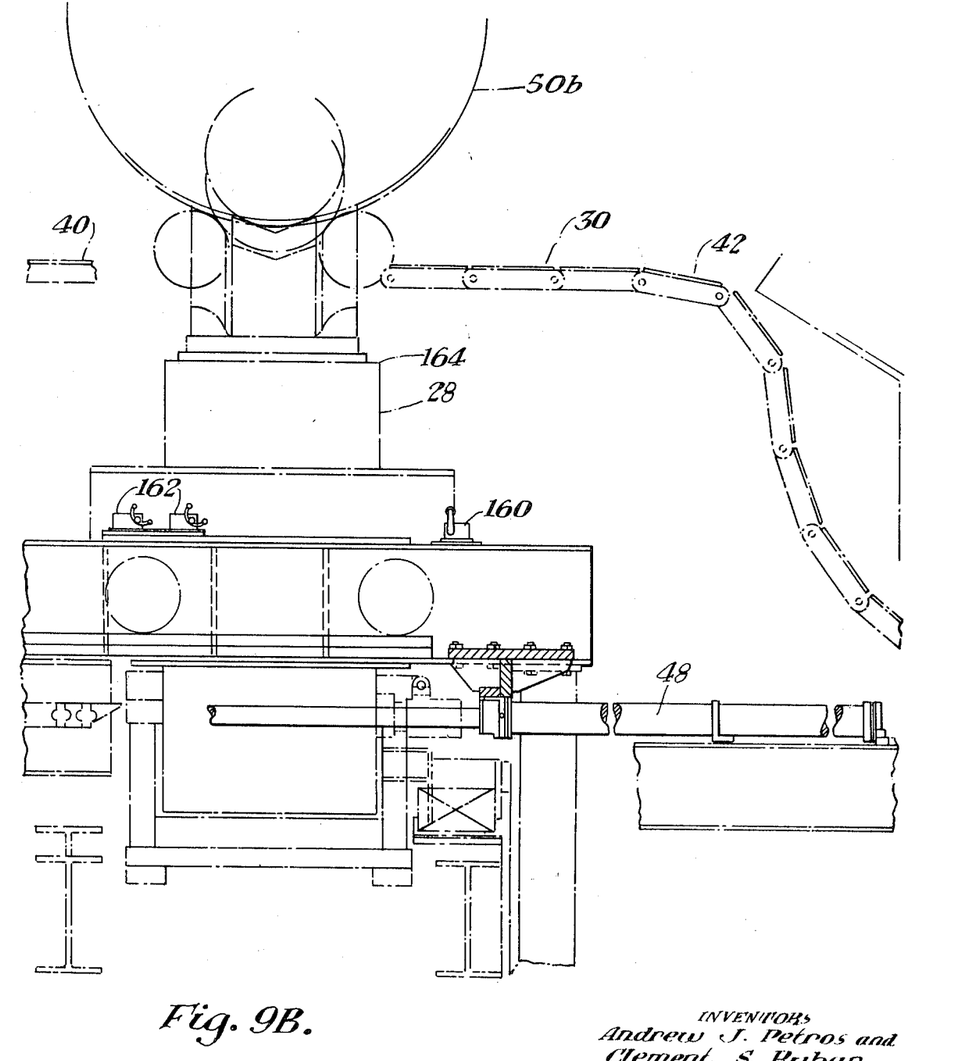

The coil car 26 and track 86 are then manipulated to reload the coil from the positioner 96 and the first coil car 26 is moved to chain-outlined position 104 which corresponds to its coil transfer position relative to the second coil car 28 at which position coil 50d is transferred to the second coil car 28. For this purpose this protruding end 106, on which the coil 50 rests, is placed generally between the bifurcate lift 108 of the second coil car 28 (FIG. 2) which is suitably elevated by cylinder 110 mounted in the second coil car. At this time a retractable track section 112 (FIGS. 4A and 4B, 5A, 5B and 5C) is actuated between positions 112, 114 (FIG. 5C) by an actuating and latching mechanism including cylinder 116 (FIGS. 2, 5A, 5B and 5C), all of which are described below in greater detail. Chain outlines 115, 117 (FIGS. 5A, 9A) indicate corresponding "power track" positions as the carriage 28 is moved between its solid (FIG. 9A) and its chain-outlined (FIG. 5A) positions.

Figure 5A:
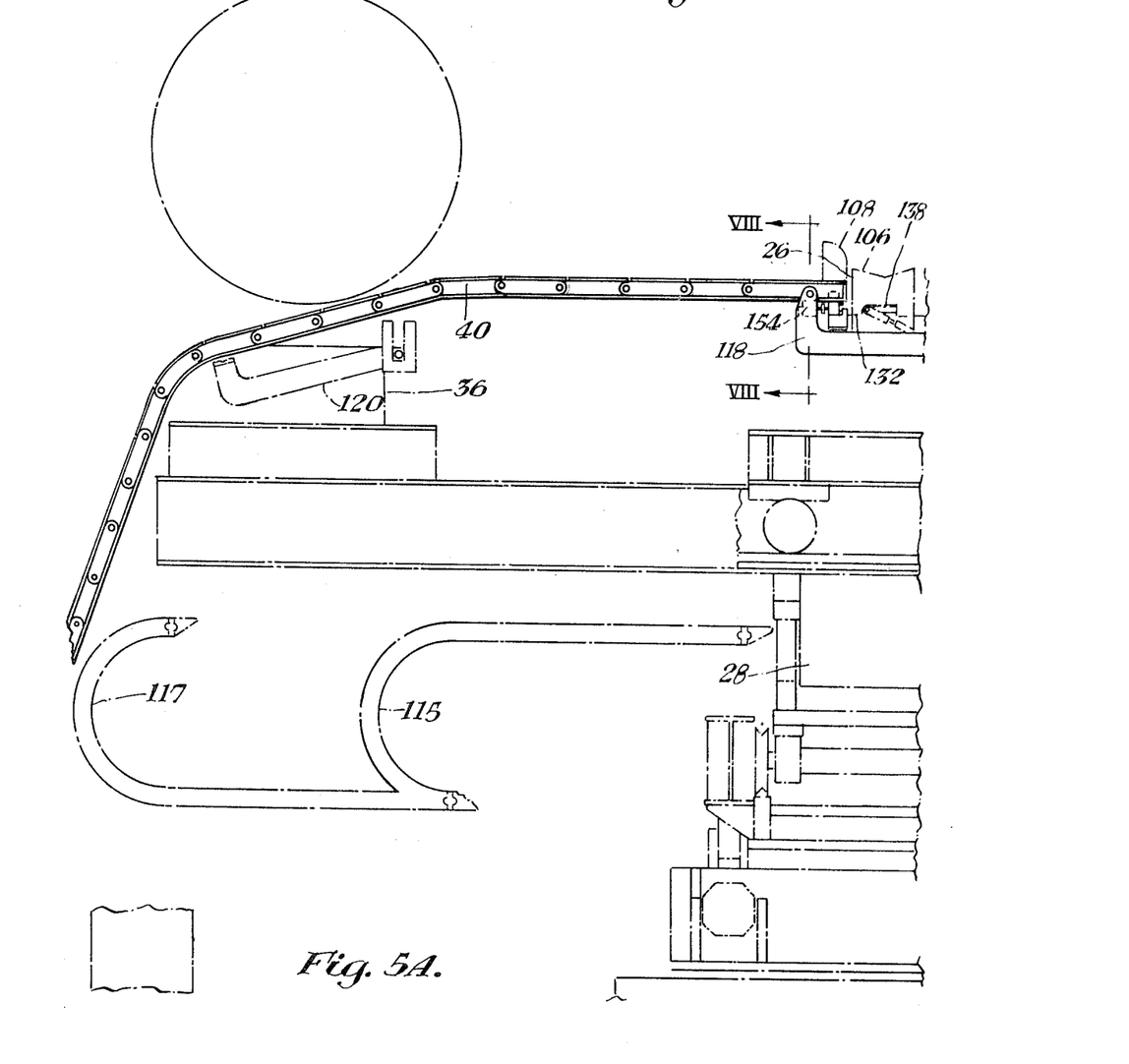
FIGS. 5A and 5B constitute a composite, partial, longitudinally sectioned view of the apparatus as shown in FIGS. 4A and 4B and taken along reference line V—V thereof.
Figure 5B:
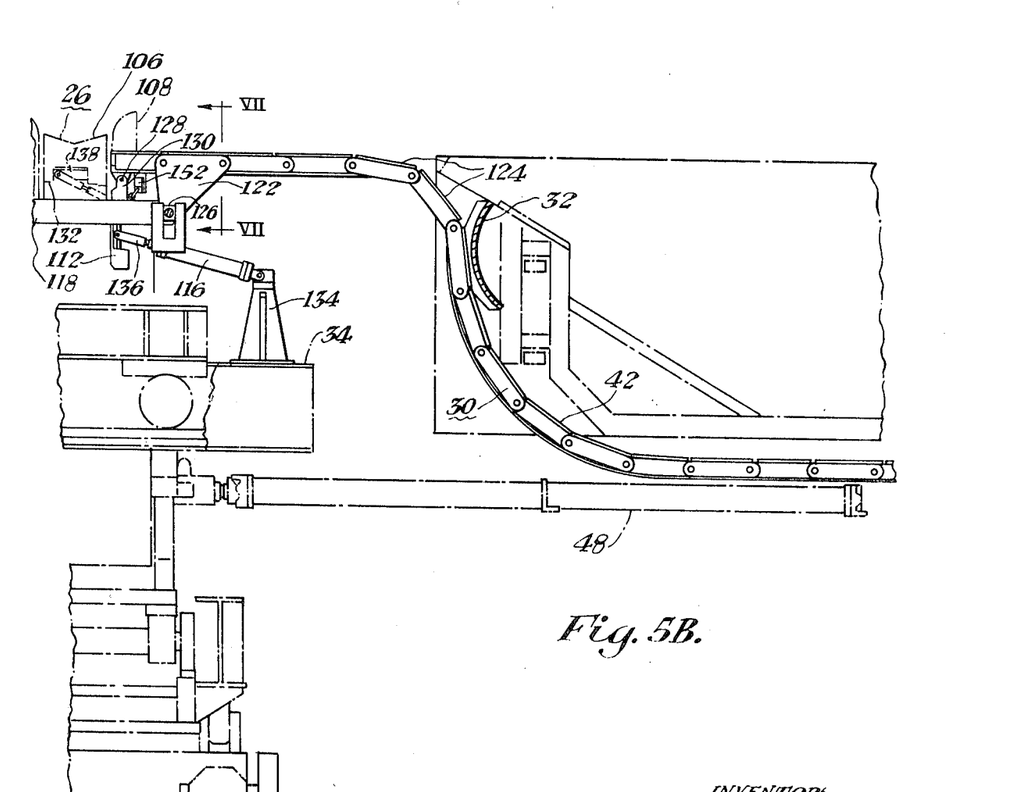
Figures 5C, 6:
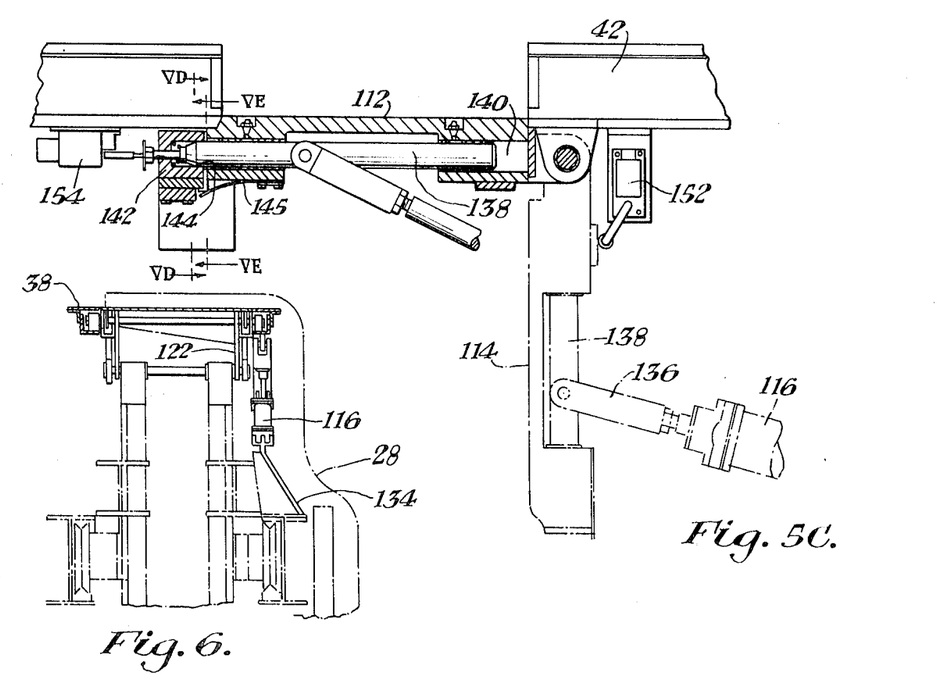
FIG. 5C is an enlarged view of the central area of the composite view represented by FIGS. 5A and 5B.
FIG. 6 is a cross-sectional view of the apparatus as shown in FIG. 4B and taken along reference line VI—VI thereof.
Figure 5D:
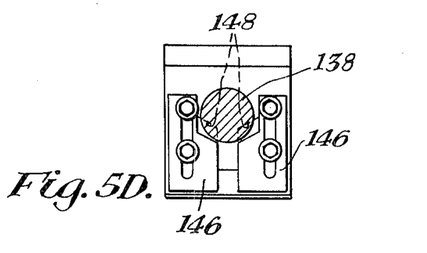
FIG. 5D is a cross-sectional view of the apparatus of FIG. 5C and taken along reference line VD—VD thereof.
Figure 5E:
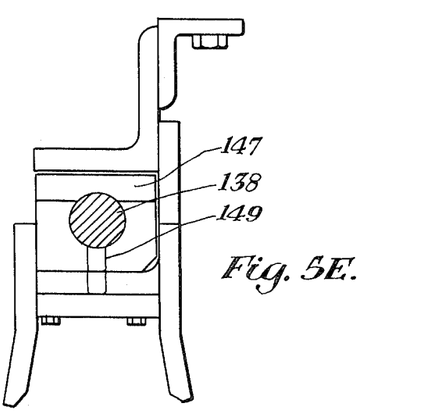
FIG. 5E is another cross-sectional view of the apparatus of FIG. 5C and taken along reference line VE—VE thereof.
Figure 8:
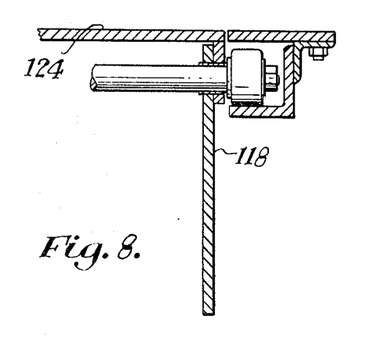
FIG. 8 is another partial enlarged cross-sectional view of the apparatus of FIG. 5A but taken along reference line VIII—VIII thereof.

Referring now more particularly to FIGS. 4A–9, the structural characteristics of the second coil car 28, the flexible floor plate 30 including the retractable track section 112 and scrap core receptacle 32, together with the positional interrelationships of these and other associated components with the first coil car 26 are illustrated more clearly. The left-hand section 40 of the flexible floor plate 30 is connected to the second coil car 28 by means of pivoted arm 118. This allows the left section 40 to enter the inclined portion of the floor plate track 44 when the second coil car is at its feed reel position 36. At this time the connecting arm 118 is pivoted downwardly to its chain outline position 120. The right-hand flexible floor plate section 42, to which is secured the scrap core receptacle or cradle 32, is likewise secured to the second coil car 28 by pivoted bracket 122 to prevent any possibility of binding. The individual floor plates 124 are wheel-mounted as shown in FIGS. 6–8. FIG. 7 also illustrates the pivotal mounting 126 of the connecting arm 118 and bracket 122. As mentioned previously this permits the individual floor plates 124 to be wheeled along tracks 40, 42 without binding.

The retractable track section 112 (FIGS. 5A, 5B and 5C), however, is pivotally connected at 128 to the adjacent end portion of one of the floor plate tracks 40, 42 for example the track 42, to which a bracket 130 is secured for this purpose. The purpose of the retractable plate 112 is to permit entry of the first coil car extension 106 when the first and second coil cars 26, 28 are at their coil-transfer positions as shown in FIGS. 4A–5B of the drawings.

The retractable track section 112 is actuated between its open position as shown in the solid outlines thereof in FIG. 5B and its chain-outlined closed position 132 by the aforementioned cylinder 116 which is pivotally mounted on standard 134 which in turn is mounted on the second coil car track 34. The distal end of the cylinder piston rod 136 is connected to a slide bolt 138 (FIG. 5C) which is slidably mounted in passage 140 extending longitudinally through the retractable track section 112. A latch member 142 is secured to the other floor plate track 40 and is provided with a passage 144 aligned with the floor plate passage 140 in the closed position of the retractable floor plate. The slide bolt is retained in the retractable track section 112 by means of a pair of retainer plates 146 that are activated by leaf spring 145 (FIG. 5D) and are positioned as shown in chain outline when the track section 112 is moved out of the closed position. When the track section 112 moves up to the closed position, shoulder 147 (FIG. 5E) of latch member 142 forces retainer plates 146 to the solid outline position shown (FIG. 5D) and further actuation of cylinder 116 protrudes the slide bolt 138 into opening 144 of the latch 142. The double-acting cylinder 116 is operated in the opposite direction to retract the slide bolt 138 and to reopen track section 112. Shoulder 149 of latch member 142 prevents the track member 112 from pivoting prematurely when slide bolt 138 disengages from latch member 142. Limit switch 154 and limit switch tripper 150 are used to tell when the retractable track section 112 is in its closed position. This intelligence is necessary for the automatic operation of the mill entry equipment.

A limit switch 152 is mounted adjacent the open position 114 (FIG. 5B) to deenergize a solenoid valve (not shown) or the like employed to actuate the double-acting cylinder in the lowering direction. On the other hand limit switch 154 at the closed position of the retractable track section 112, deenergizes a similar solenoid valve or the like employed to actuate the cylinder 116 in the floor plate closing direction. However, the retractable track section 112 is automatically lowered by suitable circuitry (not shown) actuated by limit switch 156 (FIG. 3) when the first coil car 26 commences a traversing motion from its position 158 at the coil positioner 96 to its coil-transfer position 104. The traversing mechanism for effecting this movement of the coil car 26 is prevented from energization by suitable circuitry (not shown) connected to limit switches 160 and 162 (FIGS. 9A and 9B), until the latter switches are actuated by movement of the second coil car 28 to its coil transfer position represented by chain outline 164 thereof in FIGS. 9A and 9B with its lift lowered. On the other hand, the retractable floor plate 112 is automatically raised to its closed position when the coil car 26 is returned from its coil-transfer position to the coil positioner 96 (FIG. 3) where the first coil car again actuates limit switch 156.

As shown in FIGS. 1, 2 and 10–12 means including the scrap core removal apparatus 60, holddown roller means 70–72, and the scrap core receptacle 32 are associated with the coil entry section of the mill 20 for removing the scrap cores 74. As noted above and as described presently the movements of the removal apparatus 60 and the coil receptacle 32 are integrated with the coil-feeding movements of the coil cars 26, 28 and associated components.

Figure 10:
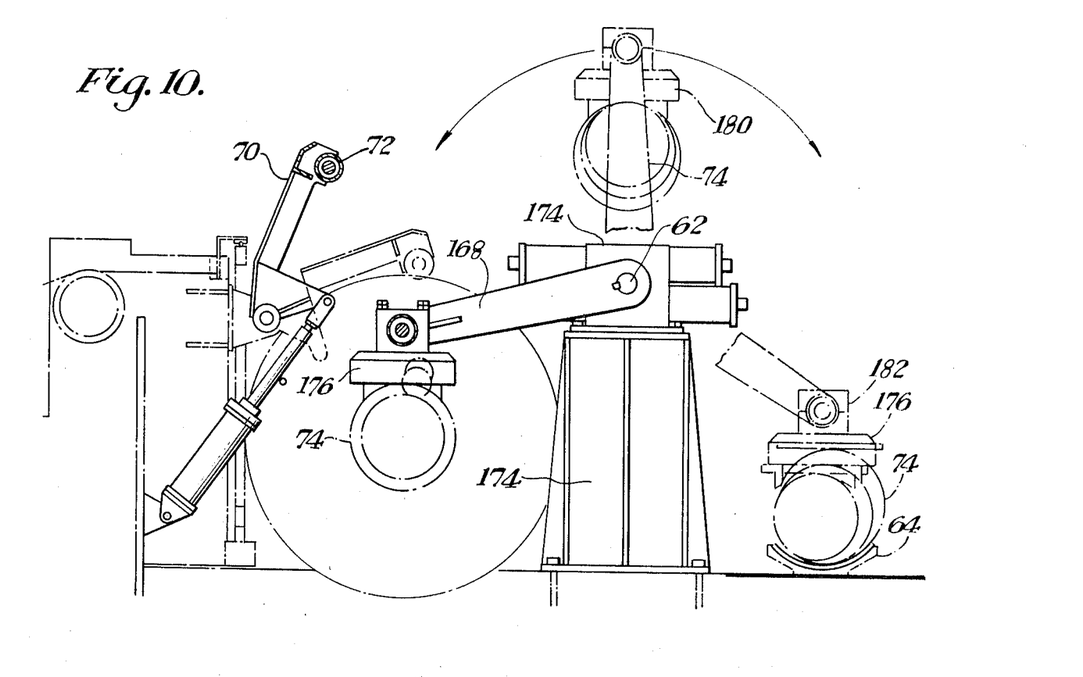
FIG. 10 is a partial, enlarged side elevational view of the apparatus as shown in FIG. 2.
Figure 11:
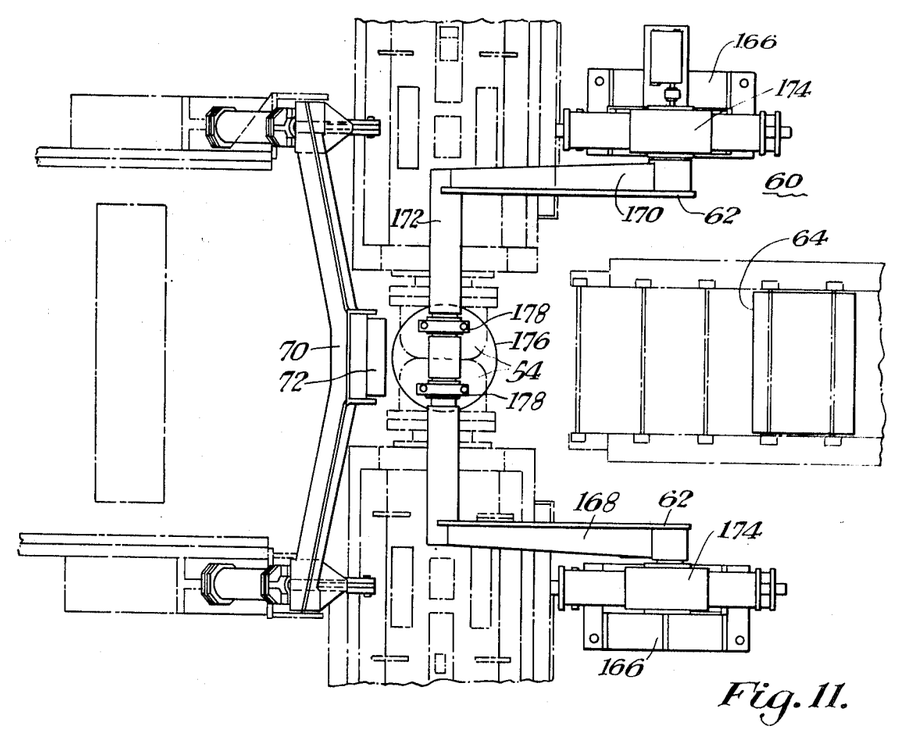
FIG. 11 is a top plan view of the apparatus as shown in FIG. 10.
Figure 12:
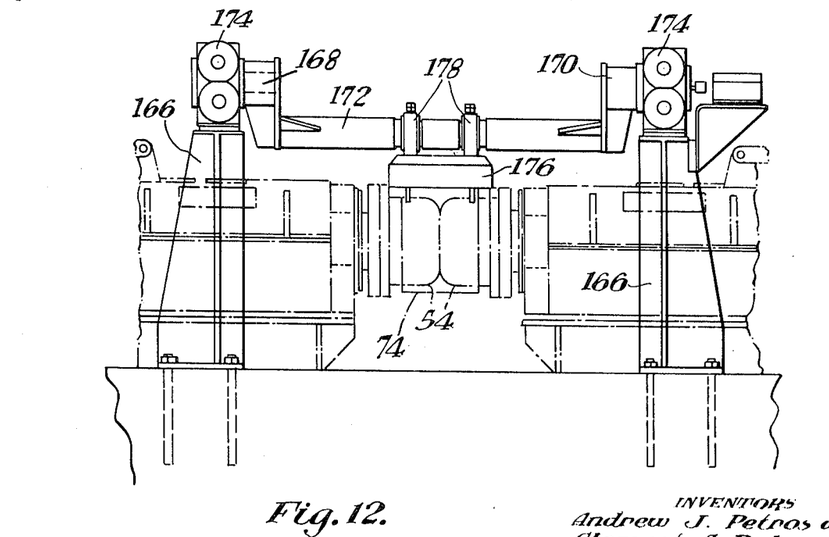
FIG. 12 is a right end elevational view of the apparatus as shown in FIG. 10.

The scrap core removal apparatus 60, as better shown in FIGS. 10–12 includes a pair of standards 166 (FIG. 11) to which is pivoted the arm assembly 62 including a pair of arms 168, 170 and interconnected crosspiece 172. The arm assembly 62 is pivoted by a pair of oscillator mechanisms 174 mounted respectively atop the standards 166. Suitable oscillators 174 are available from Ohio Oscillator Company, Pittsburgh, Pennsylvania, and are capable of exerting the necessarily heavy torques for pivoting the arm assembly 62 with a scrap core attached.

A pickup magnet assembly 176 is pivotally mounted on crosspiece 172 as denoted by reference character 178. The standards 166 and the arm assembly 62 are mounted relative to the feed reel 52 so that the arm assembly and pickup magnet can be pivoted to a point of engagement with the scrap core 74. The pivotal mounting of the pickup magnet 176 on the scrap core removal apparatus 60 and the shape of the magnet 176 permit substantially flush contact between the pickup magnet and the scrap core. The magnet 176 is energized to engage the scrap core 74, whereupon the mandrel sections 54 (FIG. 1) are retracted by cylinders 58 to release the scrap core from the feed reel.

The scrap core removal mechanism 60 can be actuated to engage the scrap core 74 when the second coil car 28 is at its coil-transfer position (FIG. 2). The arm assembly 62 is then raised to its vertical position denoted by chain outline 180 thereof (FIG. 10) at which time the second coil car 28 with a coil 50 thereon can be passed through and under the arm assembly 62 to the feed reel loading position 36 of the second coil car 28. This brings the core receptacle 32 to its chain-outlined position 64 (FIGS. 2, 10) whereat the arm assembly 62 is pivoted from its vertical position 180 (FIG. 10) to its scrap core release position denoted by its chain outline 182. In this position the pickup magnet 176 is deenergized to release the scrap core 74 to the scrap core receptacle. Upon return of the first coil car 28 to its solid outline position (FIG. 2) the core receptacle 32 is guided along flexible floor plate track 44 to the scrap bin 66 where it deposits the scrap core.

A cam limit switch (not shown) is coupled to the pivot mechanisms 174 by suitable circuitry (not shown) for defining the solid outlined or pickup position of the arm assembly 168 and its vertical and scrap core release positions 180, 182. The motions of the arm assembly 168 can be controlled, if desired, by suitable automatic or semiautomatic circuitry to concur with movements of the second coil car 28, particularly with respect to releasing the scrap core 74 to the scrap core receptacle 32 which is moved with the coil car 28. In consequence, the time previously consumed in removing the scrap cores 74 is virtually eliminated. The coil car 28 must be at its feed reel position, in this example, for the correct positioning of the core receptacle 32 relative to the scrap core unit 60.

In operation, it is assumed that the arm assembly 168 with the pickup magnet 176 (FIGS. 10–12) is initially at its vertical position and that the coil 50a (FIG. 2) is substantially paid out save for its inner wraps or scrap core 74. The mill 20 is then stopped and the strip tension is removed by withdrawal of tensioning roller 68. The holddown roll mechanism 70–72 is pivoted downwardly to make contact with the scrap core 74 remaining on the feed reel mandrel components 54. The scrap core 74 is sheared off by the housing shear blade. The feed reel mechanism 52 is then run in reverse to rewind the portion of the scrap core 74 which previously has been unwound from the feed reel 52. Upon completion of rewinding, the holddown roll 70–72 is raised.

The arm assembly 62 of the scrap core removal unit 60 is moved from its vertical position (FIG. 2) to its pickup position (FIG. 10) where the pickup magnet 176 engages the scrap core 74. Upon energization of the pickup magnet 176, the feed reel mandrels 54 are collapsed and are traversed outwardly to clear the scrap core 74. The collapsed and outwardly traverse condition of the mandrel components 54 is not illustrated as this involves conventional procedures.

The arm assembly 62, pickup magnet 176 and scrap core 74 are then moved to their vertical positions (FIG. 10), with the scrap core being held by the energized pickup magnet. At this position the scrap core 74 has been sufficiently raised to clear the incoming coil 50b (FIG. 2) on the second coil car 28, which is moved to its feed reel position 36 (FIG. 2). This movement of the second coil car, of course, carries with it the flexible floor plate sections 40, 42, to the latter of which the core receptacle 32 is attached. Movement of the second coil car, then, places the core receptacle (position 64—FIGS. 2 and 10) adjacent the scrap core removal mechanism 60.

The arm assembly 62 is then pivoted in the opposite direction from its vertical position to its core release position 176 (FIG. 10) wherein the pickup magnet is deenergized to release the scrap core 74 to the core receptacle 32. The arm assembly 62 and empty pickup magnet 176 are then returned to their vertical positions 180 (FIG. 10). At this point the second coil car 28 can be returned from its feed reel position 32 to its solid-outlined, coil-transfer position (FIG. 2). The movable floor plate sections 40, 42 are moved with the second coil car whereupon the receptacle 32 dumps the scrap core into the scrap core bin 66. The second coil car 28 then remains at its coil-transfer position, until a new coil 50b is delivered by the first transfer car 26 (FIGS. 1 and 3).

A coil 50c is delivered by entry coil conveyor 24 to the upender 89 which is pivoted by cylinder 84 to deliver the coil 50c to the first transfer car 26. The first transfer car is then moved by means of its traversing mechanism to its intermediate coil positioning position 158 (FIG. 3) at which time coil carried by the first car is delivered to the positioner 96 for shearing. As soon as the second coil car 28 reaches the transfer position, the first coil car 26 moves the incoming new coil to such coil-transfer position, as represented by coil 50d.

As the first coil car 26 leaves intermediate position 158, the limit switch 156 is actuated to permit lowering of the retractable track section 112 to its solid-outlined position in FIGS. 5A, 5B. At this time the coil-bearing extension 106 of the first coil car 26 can be inserted between the bifurcate lift 108 of the second coil car 28. The lift 108 is raised by cylinder 110 mounted within the second coil car 28, to transfer the coil 50d (FIG. 3) from the first car 26 to the transferred position represented by coil 50b (FIG. 2) on the second car 28. The aforedescribed sequence is then repeated after each subsequent coil such as the coil 50a, has been nearly paid out.

From the foregoing it will be apparent that novel and efficient forms of core removal apparatus have been described herein. While I have shown and described certain presently preferred embodiments of the invention and have illustrated presently preferred methods of practicing the same it is to be distinctly understood that the invention is not limited thereto but may be otherwise variously embodied within the spirit and scope of the invention.

I claim:

1. In a rolling mill having at least one rolling mill stand and a coil entry section for said stand disposed adjacent thereto, said entry section including a coil feed reel having scrap core release means, a scrap core removal mechanism mounted adjacent said feed reel and having releasable scrap core pickup means engageable with a scrap core on said reel and movable upon release of said core by said feed reel to a scrap core release position, a movable scrap core receptacle, and means for moving said receptacle between said release position and a repository for said scrap core and for releasing said scrap core from said pickup means upon movement of said receptacle and said pickup means to said release position.

2. In a rolling mill having at least one rolling mill stand and a coil entry section for said stand disposed adjacent thereto, said entry section including a coil feed reel, a scrap core removal mechanism mounted adjacent said feed reel and having scrap core pickup means engageable with a scrap core on said reel and movable to a scrap core release position, a movable scrap core receptacle, means for moving said receptacle between said release position and a repository for said scrap core, said entry section further including a movable coil car, and means for moving said car between said feed reel and a coil-receiving position thereof remote from said reel, said core receptacle being coupled to said coil car for movement therewith.

3. The combination according to claim 2 wherein said core removal mechanism is mounted in straddling relation to the path of movement of said car so that said car with a coil loaded thereon can pass generally beneath said pickup device with a scrap core loaded thereon.

4. The combination according to claim 2 wherein a flexible floor plate section is connected to at least one side of said car for movement therewith, and said core receptacle is connected to said floor plate section for movement therewith.

5. The combination according to claim 4 wherein track means are provided for said floor plate, said track means having a retractable track section defining said coil-receiving position and actuating means are provided for moving said retractable track section between an open position when said car is at said coil-receiving position and a closed position when said car is removed from coil-receiving position.

6. The combination according to claim 4 wherein track means are provided for said flexible floor plate section said track means being disposed to guide said scrap core receptacle between said core release position and said core repository.

7. The combination according to claim 2 wherein an additional movable coil car and an entry coil conveyor are provided, and means are provided for moving said additional coil car between said entry coil conveyor and a coil-transfer position adjacent said coil-receiving position.

8. The combination according to claim 7 wherein said first-mentioned coil car is provided with a lift device to transfer a coil from said additional coil car at said coil-receiving position.

9. The combination according to claim 5 wherein an additional coil car is provided for moving an incoming coil to said coil-receiving position, and actuating means are provided for retracting said track section to its open position as said additional coil car approaches said coil-receiving position.

10. The combination according to claim 5 wherein a slide bolt is slidably mounted on said track section for protrusion therefrom into a latch shaped to receive an end portion of said bolt and disposed at a closed position of said track section, said actuating means are connected to said slide bolt, and a keeper mounted on said retractable floor plate engageable with said slide bolt to prevent protrusion thereof until said track section is placed in its closed position by said actuating means, whereupon continued operation of said actuating means protrudes said slide bolt to retain said retractable track section in its closed position.

11. The combination according to claim 10 wherein said first-mentioned coil car is provided with a flexible floor plate section connected to each side thereof, track members are provided for said floor sections, said track members being spaced to define said coil receiving position, said retractable track section being pivotally mounted on an end portion of one of said track members for movement to a closed position bridging the opening between said track members.

12. The combination according to claim 11 wherein locking means are mounted on the adjacent end portion of other of said track members for locking said track section in its said closed position.

13. In a rolling mill having at least one rolling mill stand and a coil entry section for said stand disposed adjacent thereto, a coil feed reel, a first coil car movable between an entry coil conveyor and a coil transfer position, a second coil car movable between said coil transfer position and said feed reel, flexible floor plate means including track members disposed adjacent said coil-transfer position, said track members being spaced to define said position, and a retractable track section mounted on a position-defining end portion of one of said track members for bridging the space between the spaced track members.

14. The combination according to claim 13 wherein a latch member is mounted on the adjacent end portion of the other of said track members and cooperating means are formed on said latch member and said retractable track section for locking said track section in said closed position.

15. In a rolling mill having at least one rolling mill stand and a coil entry section for said stand disposed adjacent thereto, said entry section including a coil feed reel, a scrap core removal mechanism mounted adjacent said feed reel and having scrap core pickup means engageable with a scrap core on said reel and movable to a scrap core release position, a movable scrap core receptacle, means for moving said receptacle between said release position and a repository for said scrap core, and coil transfer apparatus coupled to said receptacle for movement therewith between coil-delivery and coil-receiving positions of said apparatus.

16. The combination according to claim 1 wherein a movable and flexible floor plate section is connected to said receptacle for movement therewith.

17. The combination according to claim 15 wherein said coil transfer apparatus includes a first transfer mechanism moveable between an entry coil conveyor and a coil-transfer position and a second transfer mechanism moveable between said coil-transfer position and said feed reel.

18. The combination according to claim 15 wherein said coil-transfer apparatus is coupled to said scrap core receptacle through a moveable and flexible floor plate section.